US007173452B2

(12) United States Patent
Folsom

(10) Patent No.: US 7,173,452 B2
(45) Date of Patent: Feb. 6, 2007

(54) RE-PROGRAMMABLE FINITE STATE MACHINE

(75) Inventor: Brian Robert Folsom, Stow, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 189 days.

(21) Appl. No.: 10/245,436

(22) Filed: Sep. 16, 2002

(65) Prior Publication Data

US 2004/0054848 A1    Mar. 18, 2004

(51) Int. Cl.
*G06F 12/00* (2006.01)
(52) U.S. Cl. .................... 326/46; 711/108; 711/220
(58) Field of Classification Search ............ 711/108; 365/49; 712/201; 326/46, 38
See application file for complete search history.

(56) References Cited

U.S. PATENT DOCUMENTS

| 4,674,089 | A | * | 6/1987 | Poret et al. .................. 714/28 |
| 5,125,098 | A | * | 6/1992 | Burrows ..................... 711/108 |
| 5,621,337 | A | * | 4/1997 | Childs ......................... 326/46 |
| 5,860,085 | A | * | 1/1999 | Stormon et al. ............ 711/108 |
| 6,362,990 | B1 | * | 3/2002 | Gibson et al. ................ 365/49 |
| 6,418,042 | B1 | * | 7/2002 | Srinivasan et al. ........... 356/49 |
| 7,082,044 | B2 | * | 7/2006 | Gould et al. ................. 365/49 |

OTHER PUBLICATIONS

Design of multi-field IPv6 packet classifiers using ternary CAMs□□Nen-Fu Huang; Whai-En Chen; Jiau-Yu Luo; Jun-Min Chen; Global Telecommunications Conference, 2001. GLOBECOM '01.□□IEEE , vol. 3, Nov. 25-29, 2001; pp. 1877-1881 vol. 3.*

A longest prefix match search engine for multi-gigabit IP processing□□Kobayashi, M.; Murase, T.; Kuriyama, A.;Communications, 2000. ICC 2000. 2000 IEEE International Conference on , vol. 3, Jun. 18-22, 2000; pp. 1360-1364 vol. 3.*

VLSI implementation of routing tables: tries and CAMs□□Pei, T.-B.; Zukowski, C.;INFOCOM '91. Proceedings. Tenth Annual Joint Conference of the IEEE Computer and Communications Societies. Networking in the 90s. IEEE , Apr. 7-11, 1991; pp. 515-524 vol. 2.*

A reconfigurable content addressable memory McAuley, A.J.; Cotton, C.J.; Custom Integrated Circuits Conference, 1990., Proceedings of the IEEE 1990, May 13-16, 1990 pp. 24.1/1-24.1/4.*

(Continued)

*Primary Examiner*—Brian R. Peugh
*Assistant Examiner*—Jesse Diller
(74) *Attorney, Agent, or Firm*—Morrison & Foerster LLP

(57) ABSTRACT

A re-programmable finite state machine comprising a content-addressable memory ("CAM") and a read/write memory output array ("OA"). In operation, the CAM receives and periodically latches a status vector, and generates a match vector as a function of the status vector and a set of stored compare vectors. In response, the OA selects for output one of a set of a control vector as a function of the match vector. A state vector portion of the selected control vector is forwarded to the CAM as a portion of the status vector. An output vector portion of the selected control vector controls the operation of external components. Both the set of stored compare vectors and the set of control vectors are fully re-programmable.

9 Claims, 6 Drawing Sheets

OTHER PUBLICATIONS

Takao Matsuda et al., "A new protocol processing architechture for high-speed networks", 1996 IEEE.*

Yutai Ma et al., "A Simple State Transition Control for FSM Programmable Protocol Processors", 2000 IEEE. Proc., 43$^{rd}$ Midwest Symp. on Circuits and Systems, Aug. 8-11, 2000.*

* cited by examiner

RE-PROGRAMMABLE FINITE STATE MACHINE

BACKGROUND OF THE INVENTION

1. Technical Field

The present invention relates generally to finite state machines, and, in particular, to programmable finite state machines.

2. Background Art

In general, in the descriptions that follow, I will italicize the first occurrence of each special term of art which should be familiar to those skilled in the art of digital data processing systems, and, in particular, finite state machines ("FSMs"). In addition, when I first introduce a term that I believe to be new or that I will use in a context that I believe to be new, I will bold the term and provide the definition that I intend to apply to that term. From time to time, throughout this description, I will use the terms assert and negate when referring to the rendering of a signal, signal flag, status bit, or similar apparatus into its logically true or logically false state, respectively.

FSMs are the basis of many digital logic circuits. In general, a FSM is any logical entity designed to sequentially step, in a controlled manner, through a finite set of operating stages, called states. As shown in FIG. 1, a conventional, non-trivial FSM is comprised of three components:

A current state register ("CSR"), comprising m edge-triggered flip-flops, that latches an m-bit next state vector in response to the assertion of a clock signal ("Clock"), and thereafter provides as an output the latched next state vector as an m-bit current state vector;

A block of next state logic ("NSL"), consisting of combinational logic, that generates as an output the next state vector as a function of the current state vector and a multi-bit input vector; and A block of output logic ("OL"), also consisting of combinational logic, that generates a selected one of n multi-bit output vectors as a function of the current state vector and, as appropriate, one or more of the various signals comprising the input vector.

In operation, suitable start-up circuitry (not shown) generates a predetermined initial state vector, either directly or via the NSL, and forces the CSR to latch this vector. From the CSR, this initial state vector propagates to the NSL where, depending upon the instantaneous logical values of the various signals comprising the input vector, a selected next state vector will be dynamically generated. Upon the next assertion of the clock, the CSR will latch the then-current next state vector; any next state vectors generated by the NSL between clock assertions are simply ignored. Once latched, this next state vector becomes the current state vector. In each state, the OL will generate a respective output vector, each component signal of which will initiate/control one or more specific system operations. In a well defined FSM, this recursive process will repeat indefinitely, in synchronization with the clock, until the FSM reaches an end state, that is, a state from which there is no defined next state. To restart operation, the start-up circuit must be reactivated.

In the prior art, FSMs have been proposed in which a conventional programmable logic array ("PLA") is used to implement either or both of the NSL and OL. A principle advantage of such an implementation is that the operating characteristics of the FSM can be easily and conveniently modified to adapt the FSM for use in diverse applications. One significant disadvantage of this technique, however, is that the structure of a PLA is fixed at the time of manufacturing and is thus not subject to subsequent reprogramming. Although it may be possible to use field-programmable PLAs or to substitute a conventional read/write memory ("RWM") structure for a PLA, the re-programming operation is problematic, and I am aware of no proposed solutions.

A content addressable memory ("CAM") is a digital circuit that performs the function of a fully associative memory. As shown in FIG. 2, a typical CAM is comprised of two components:

A compare register ("CR"), consisting of r edge-triggered flip-flops, that latches, in synchronization with a clock signal ("Clock"), an r-bit input vector to be matched; and A compare array ("CA"), consisting of s match elements, each of which consists of r RWM cells that store a selected one of s r-bit compare vectors, and r-bit compare logic which generates as an output a respective bit of an s-bit match vector as a function of respective bits of the input vector and the stored compare vector.

In a conventional binary CAM, each cell can store a selected one of two logical values: false or '0'; or true or '1'. In such an implementation, for a match to occur, the logical value of each bit of the input vector must exactly match the logical value of corresponding bit of the compare vector. I am aware of no prior art FSM implemented using CAMs.

In a ternary CAM ("TCAM"), each cell can store a selected one of three logical values: false or '0'; true or '1'; or don't care or 'X'. In such an implementation, for a match to occur, the logical value of each bit of the input vector for which the logical value of the corresponding bit of the compare vector is not an 'X' must exactly match the logical value of corresponding bit of the compare vector; all bits of the input vector for which the corresponding bit of the compare vector is an 'X' are simply ignored when performing the match operation. Thus, the 'X' value functions as a per-bit mask enabling the TCAM to employ compare vectors containing wildcards. I am aware of no prior art FSM implemented using TCAMs.

In the rapidly growing telecommunications industry, protocols for the interchange of data tend to evolve quickly, with the result that hardware implementations frequently become obsolete before the cost thereof have been fully amortized. Although general purpose, programmable digital data processing systems can be used in such applications to provide field upgradeability, the processing power of such systems is usually underutilized, thus increasing unnecessarily the cost of such systems. But for the lack of field re-programmability, suitably programmed FSMs would provide a more cost effective solution for many of these applications. What is needed, therefore, is a field re-programmable FSM ("RFSM"). In particular, I submit that a more efficient apparatus and method is needed for re-programming a FSM.

BRIEF DESCRIPTION OF THE SEVERAL VIEWS OF THE DRAWINGS

My invention may be more fully understood by a description of certain preferred embodiments in conjunction with the attached drawings in which.

Figure 1:
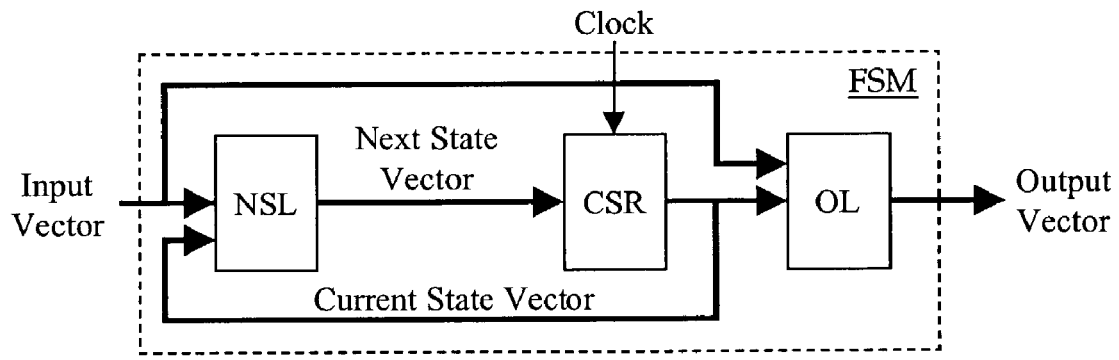
FIG. 1 is a block representation of a prior art FSM.
Figure 2:
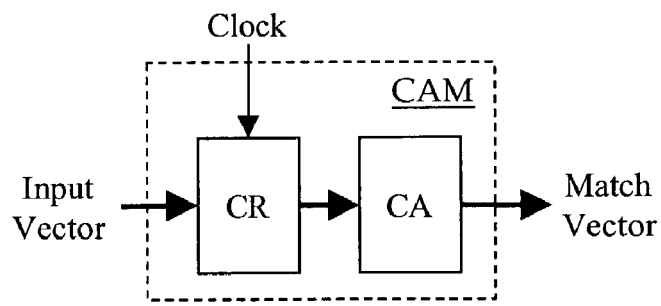
FIG. 2 is a block representation of a prior art CAM.

In the drawings, similar elements will be similarly numbered whenever possible. However, this practice is simply for convenience of reference and to avoid unnecessary proliferation of numbers, and is not intended to imply or suggest that my invention requires identity in either function or structure in the several embodiments.

DETAILED DESCRIPTION OF THE INVENTION

Figure 3:
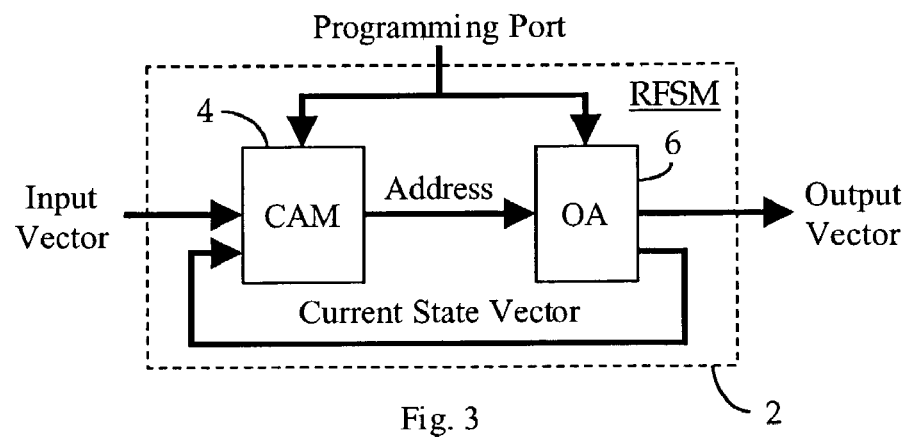
FIG. 3 is a block representation of a CAM-based RFSM constructed in accordance with the preferred embodiment of my invention.

Shown in FIG. 3 is the preferred embodiment of my RFSM 2 comprising a CAM 4 and a conventional RWM output array OA 6. Within the CAM 4 (see, FIG. 4), the CR 8, in response to a clock signal (not shown), latches the current state vector ("Sc Vector") and the current input vector ("Ic Vector"); in effect, the CR 8 performs the equivalent function of the CSR in the classic FSM shown in FIG. 1. In the CA 10, I store a set of compare vectors selected to match particular values of the current state and input vectors; in effect, the CA 10 performs the equivalent function of the next state decision logic of the NSL (again, see, FIG. 1). Within the OA 6 I store a set of compound control vectors, each consisting of an output vector portion and a next state vector portion.

In operation, the CAM 4 generates a match vector as a function of the current state vector and the current input vector. This match vector is then applied as an address ("Address") to the OA 6 to select a particular one of the control vectors. Upon selection, the next state vector portion of the selected control vector becomes the current state vector and the output vector portion is output as the respective output vector. In this configuration, these components cooperate to perform as a fully and dynamically reprogrammable FSM.

Figure 4:
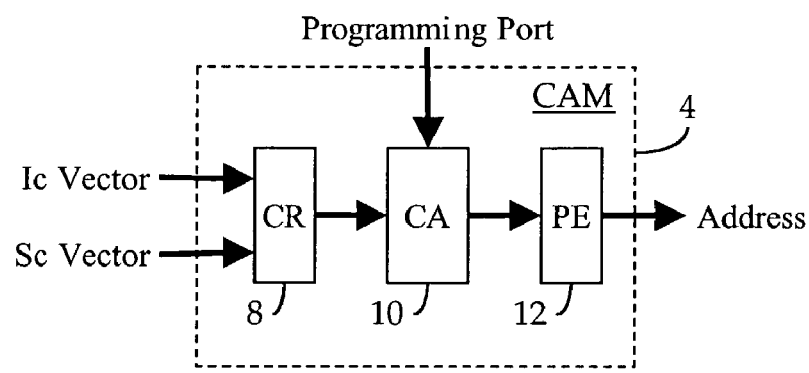
FIG. 4 is a block representation of a CAM specially adapted for use in the RFSM shown in FIG. 3.

Although I will discuss in greater detail below several techniques for accomplishing the re-programming operation, I should point out here that particular care must be taken in selecting the compare vectors to be stored in the CA in order to prevent a multiple match condition since this minimal implementation has no mechanism for resolving such conflicts. One solution, shown in FIG. 4, is to provide a conventional priority encoder ("PE 12") to assure that priority is granted to only the least significant of all simultaneously asserted match bits of the match vector.

Figure 5:
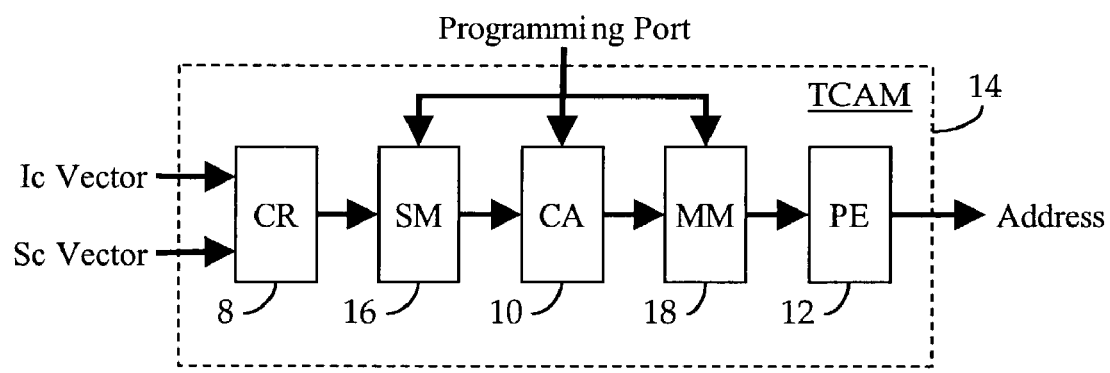
FIG. 5 is a block representation of a TCAM specially adapted for use in the RFSM shown in FIG. 3.

Shown in FIG. 5 is an enhanced, fully maskable TCAM 14 that I prefer to use in my RFSM 2. As in the CAM 4, the TCAM 14 includes a CR 8 but the CA 10 is ternary rather than binary. In addition, TCAM 14 includes a status mask register ("SM 16") and a match mask register ("MM 18"). The SM 16 is adapted to be programmed via the programming port to selectively mask bits of the current state and input vectors stored in the CR 8. Similarly, the MM 18 is adapted to be programmed via the programming port to selectively mask bits of the match vector generated by the CA 10. I will describe below how these additional components, in addition to the inherent ternary nature of the CA 10, greatly enhance the versatility and applicability of my RFSM 2.

Figure 6:
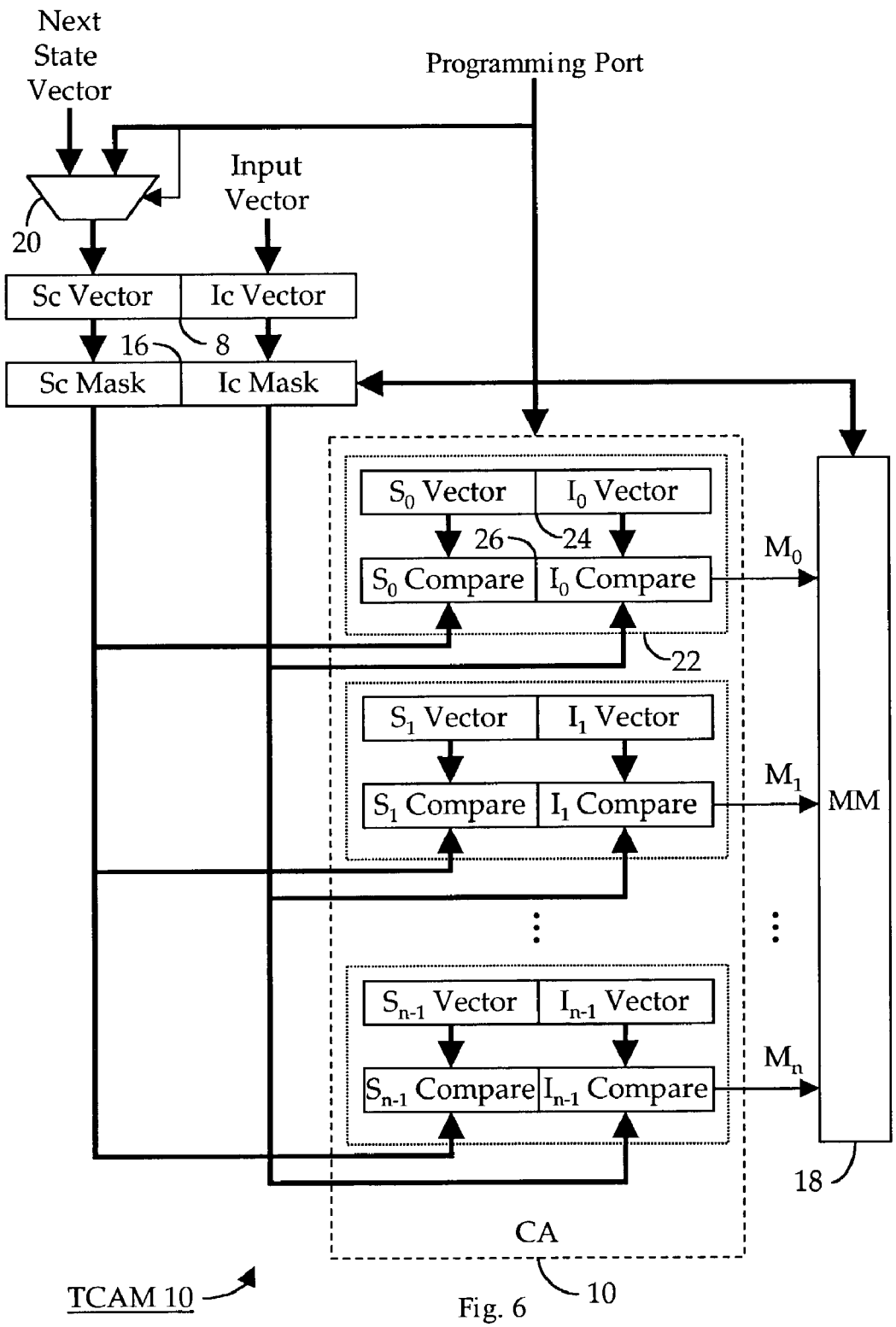
FIG. 6 is a detailed block representation of the TCAM shown in FIG. 5.

As shown in greater detail in FIG. 6, the CR 8 is adapted to latch a compound status vector consisting of the next state vector (stored as "$S_C$ Vector") and the current input vector (stored as "$I_C$ Vector"). By way of example, I have shown a 2-to-1 next state multiplexer 20 that is adapted to dynamically force load a new next state vector into the CR 8 via the programming port to facilitate starting or context switching of the RFSM 2. Similarly, the SM 16 is adapted to latch a compound status mask vector consisting of the current state vector (stored as "$S_C$ Mask") and the current input vector (stored as "$I_C$ Mask") for respectively masking selected bits of the $S_c$ and $I_C$ vectors. The MM 18 is adapted to latch an n-bit match mask vector, each bit of which selectively masks a respective bit of the match vector generated by the CA 10.

In the CA 10, each of the n match elements 22 includes a compare latch 24 and a match comparator 26. Each compare latch 24 latches a respective one of n compound compare vectors, each consisting of a selected state vector (stored as "$S_X$ Vector") and a selected input vector (stored as "$I_X$ Vector"), where x is from 0 to n–1. Each match comparator 26 includes match circuitry for simultaneously comparing the logical value of each of the bits of the status vector stored in the CR 8 (after masking by the status mask vector stored in the SM 16) to the logical value of a respective one of the bits of the compare vector stored in the respective compare latch 24; as noted above, all bits of the status vector for which the respective bits of the compare vector are 'X' are ignored. The several match outputs, $M_0$ through $M_n$, of the n match comparators, comprising respective bits of the match vector, are selectively masked by corresponding bits of the match mask vector stored in the MM 18. If wildcards are used in the match comparison, multiple matches may occur, so I prioritize the compare vectors such that the most appropriate match is stored in the least significant one of the n match elements 22. As noted above, due to multiple simultaneous matches resulting from the use of wildcards (or, optionally, masking), the MM 18 may generate the same address from more than one valid match vector; in effect, if multiple match bits are simultaneously asserted in a match vector, the asserted bit having the least significance will dominate all asserted bits of higher significance.

Figure 7:
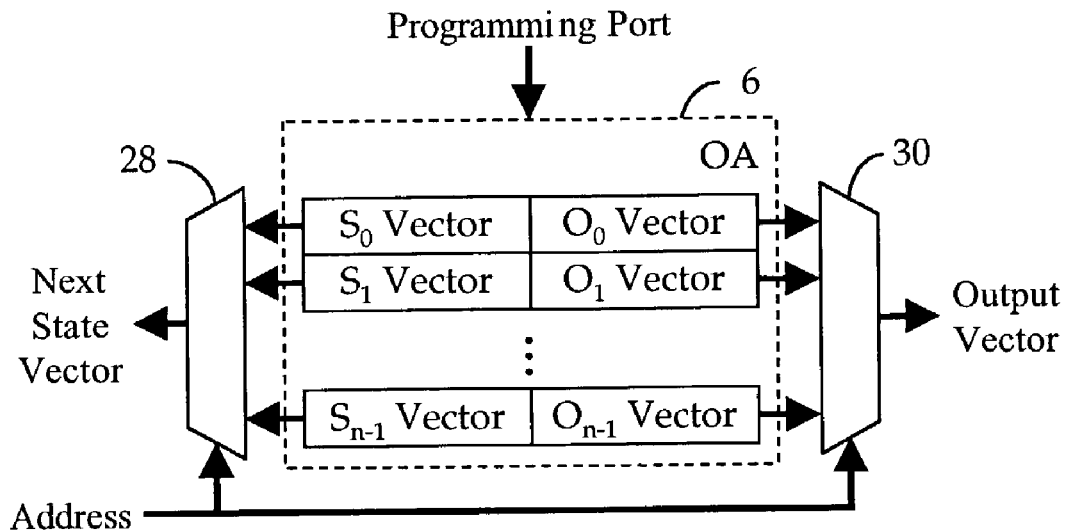
FIG. 7 is a block representation of the OA portion of the RFSM shown in FIG. 3.

As shown in FIG. 7, the OA 6 comprises an array of RWM cells arranged to form n addressable words, each adapted to store a compound control vector consisting of a next state vector ("$S_X$ Vector") and a next output vector ("$O_X$ Vector"), where x is from 0 to n–1. A pair of conventional multi-bit n-to-1 multiplexers, mux 28 and mux 30, respectively, select for output the $S_X$ Vector and the $O_X$ Vector stored in the particular word having the address generated by the TCAM 14 (or, in a minimal implementation, the CAM 4). Upon selection, the $S_X$ Vector portion of the selected control vector will be forwarded to the TCAM 14 (CAM 4) as the now-current state vector, and, simultaneously, the $O_X$ Vector portion will be output as the current output vector. I will describe below how I use the programming port to set up the several programmable resources in my RFSM 2.

With respect to a conventional FSM, the CR 8 implements the equivalent function of the CSR, i.e., storing the current state vector, albeit only at the end of a clock cycle rather than at the start. Similarly, the CA 10 cooperates with the OA 6 to implement the functions of both the NSL and the OL, i.e., simultaneously generating the next/current state vector and the output vector.

Figure 8:
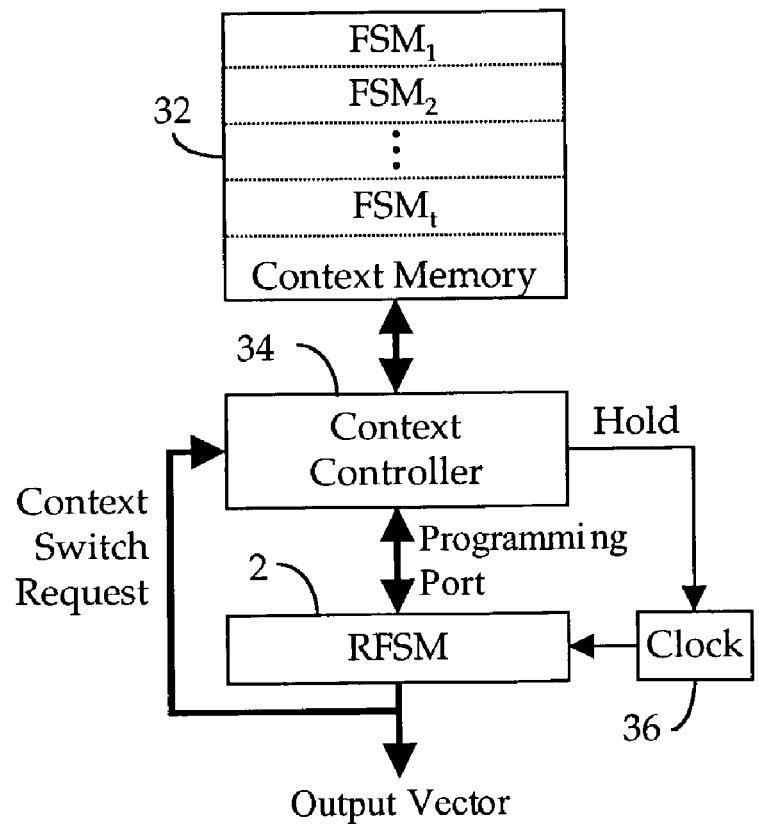
FIG. 8 is a block representation of a system adapted to dynamically reprogram the RFSM shown in FIG. 3.

Shown in FIG. 8 is the system configuration I prefer to use to dynamically re-program my RFSM 2. In a context memory 32, I store the data bases for a number of different FSMs, each data base including all of the values to be programmed into the several programmable resources within the RFSM 2 so that, upon being so programmed, the RFSM 2 can operate autonomously as a fully functional FSM. By way of example, I have illustrated the context memory 32 as containing the data bases for t unique FSMs, "$FSM_1$" through "$FSM_t$". In response to the assertion of a context switch request signal, a context controller 34 will download the data base for the requested FSM from the context memory 32 into the RFSM 2. By way of example, the RFSM 2 may be programmed to selectively assert the context switch signal as one of the many signals comprising the output vector. To avoid unpredictable behavior during the download operation, the context controller 34 may assert a hold signal to a clock 36 to freeze the clock signal to the RFSM 2. If the resources of the RFSM 2 are sufficient, the time duration that the RFSM 2 is halted can be minimized by downloading the new data base into unused (or even duplicate) resources. Upon the completion of the download operation, the context controller 34 can employ a mechanism such as the next state multiplexer 20 to switch the RFSM 2 essentially instantaneously to the initial state of the new FSM. As an alternative, each FSM can be programmed to stall the RFSM 2 upon asserting the context switch request signal, and the context controller 34 can simply re-start the RFSM 2 when the download operation has been completed. A conventional, programmable digital data processor, such as the Pentium™ processor commercially available from the Intel Corporation, is quite suitable for performing the functions of the context controller 34.

My RFSM 2 also supports the concurrent operation of multiple interactive and non-interactive FSMs. By way of example, I have shown in FIG. 9 one possible arrangement using, in this case, just the resources available in the TCAM 14 (see, FIG. 5) to implement multiple FSMs. In this arrangement, I have partitioned the CA 10 to accommodate four distinct FSMs: a unitary FSM labeled "$S_0$"; a pair of FSMs, labeled "$S_1$" and "$S_2$", adapted to operate either independently or concurrently; and a compound FSM labeled "$S_3$" which includes a nested sub-FSM that I have labeled "$s_3$". To facilitate selective activation of each of these FSMs, I have logically partitioned the SM 16 into two next status mask portions, labeled $S_{C0}$ and $S_{C1}$, and two input vector mask portions, labeled $I_{C0}$ and $I_{C1}$. In addition, I have logically partitioned the MM 18 (see, FIG. 5) into four match vector mask portions, labeled $M_0$, $M_1$, $M_2$, and $M_3$.

To activate $FSM_0$ the context controller 34 (or other suitable external controller, not shown) must first halt the clock 36. Second, it loads the SM 16 with a suitable status mask value to pass all of the indicated portions of the next state vector and the input vector, namely the portions, $S_{C0}$, $S_{C1}$, $I_{C0}$ and $I_{C1}$. Third, it loads the MM 18 with a suitable match mask, passing the portion $M_0$ while masking the remaining portions, $M_1$, $M_2$, and $M_3$. Fourth, it force loads the initial state vector for $FSM_0$, as I have described above. Finally, it can release the clock 36 and allow $FSM_0$ to begin operation.

To activate only $FSM_1$ the context controller 34 (or other suitable external controller, not shown) must first halt the clock 36. Second, it loads SM 16 with a suitable status mask value to pass the $S_{C0}$ and $I_{C0}$ portions of the next state vector and the input vector, respectively, while masking the remaining portions $S_{C1}$ and $I_{C1}$. Third, it loads the MM 18 with a suitable match mask, passing the portions $M_1$ and $M_2$ while masking the remaining portions, $M_0$ and $M_3$. Fourth, it force loads the initial state vector for $FSM_1$, as I have described above. Finally, it can release the clock 36 and allow $FSM_1$ to begin operation.

To activate only $FSM_2$ the context controller 34 (or other suitable external controller, not shown) must first halt the clock 36. Second, it loads the SM 16 with a suitable status mask value to pass the $S_{C1}$ and $I_{C1}$ portions of the next state vector and the input vector, respectively, while masking the remaining portions $S_{C0}$ and $I_{C0}$. Third, it loads the MM 18 with a suitable match mask, passing only the portion $M_1$ while masking the remaining portions, $M_0$, $M_2$ and $M_3$. Fourth, it force loads the initial state vector for $FSM_2$, as I have described above. Finally, it can release the clock 36 and allow $FSM_2$ to begin operation.

To activate both $FSM_1$ and $FSM_2$ the context controller 34 (or other suitable external controller, not shown) must first halt the clock 36. Second, it loads the SM 16 with a suitable status mask value to pass all of the indicated portions of the next state vector and the input vector, namely the portions, $S_{C0}$, $S_{C1}$, $I_{C0}$ and $I_{C1}$. Third, it loads the MM 18 with a suitable match mask, passing the portions $M_1$ and $M_2$ while masking the remaining portions, $M_0$ and $M_3$. Fourth, it force loads a suitable compound initial state vector for $FSM_1$ and $FSM_2$, as I have described above. Finally, it can release the clock 36 and allow $FSM_1$ and $FSM_2$ to begin concurrent operation.

To activate $FSM_3$ the context controller 34 (or other suitable external controller, not shown) must first halt the clock 36. Second, it loads the SM 16 with a suitable status mask value to pass all of the indicated portions of the next state vector and the input vector, namely the portions, $S_{C0}$, $S_{C1}$, $I_{C0}$ and $I_{C1}$. Third, it loads the MM 18 with a suitable match mask, passing the portion $M_3$ while masking the remaining portions, $M_0$, $M_1$, and $M_2$. Fourth, it force loads the initial state vector for $FSM_3$, as I have described above. Finally, it can release the clock 36 and allow $FSM_3$ to begin operation. As a selected point in the main flow of $FSM_3$, the sub-FSM $s_3$ can be automatically activated simply by a normal change of flow; return to the main flow can also be achieved using a normal change of flow.

Using the mechanism I have just described, the time duration required to effect a complete context switch between any of a plurality of simultaneously-resident FSMs, each of which can be either unitary, concurrent or nested, can be reduced to as few as two register load cycles, plus the time to halt/release the clock 36. For a simpler set of FSMs it may be possible to eliminate the load of either the SM 16 or the MM 18, or, perhaps, even both loads. Note that those portions of the CA 10 that are masked by the MM 18 may be re-programmed at any time without perturbing the operation of the active FSM, thus facilitating the background loading of the data bases of new FSMs.

Figure 9:
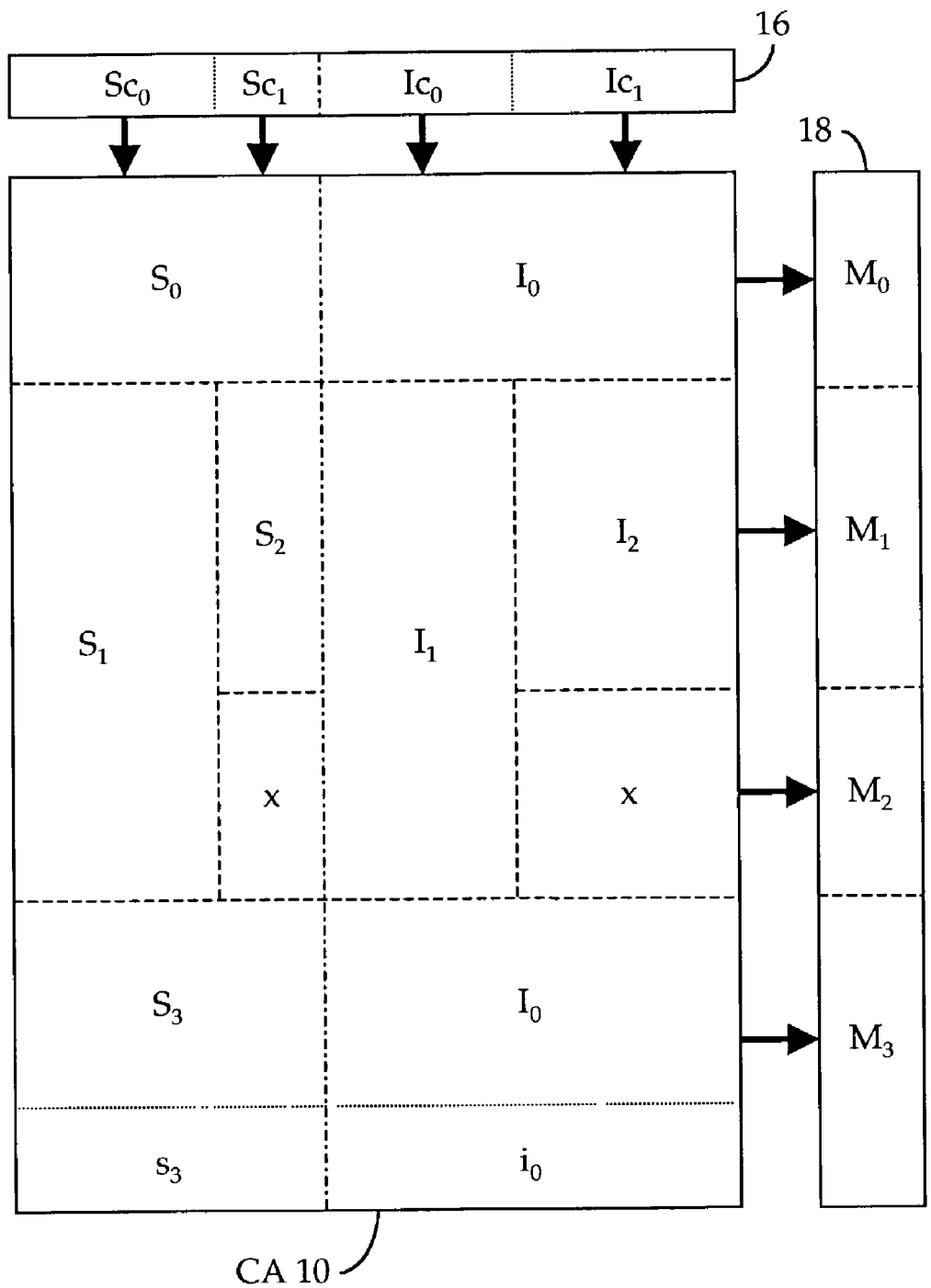
FIG. 9 is a block representation of one possible arrangement, by way of example, for implementing a plurality of FSMs, including unitary, concurrent and nested, using the RFSM shown in FIG. 3.
Figure 10:
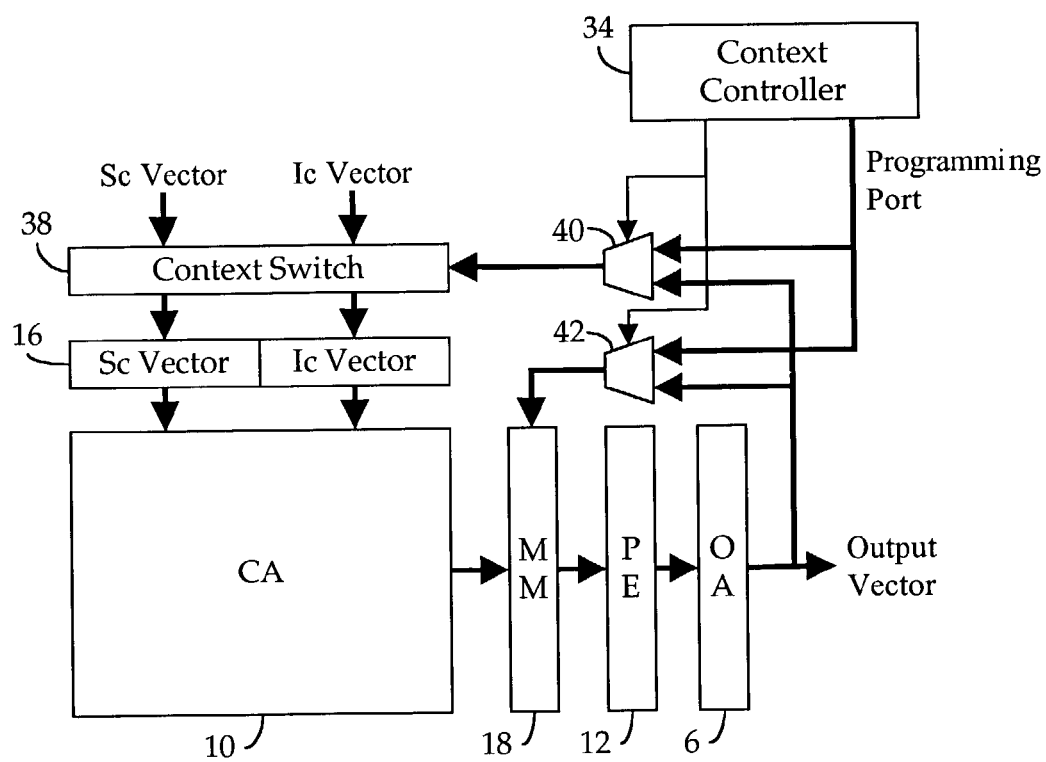
FIG. 10 is a block representation of one possible arrangement, by way of example, for facilitating context switching among a plurality of FSMs, such as in the embodiment shown in FIG. 9.

In the multi-FSM embodiment shown in FIG. 9, I have assumed that the concurrent FSMs, FSM1 and FMS2, interact with separate and distinct subsets of the various signals comprising the next state and input vectors. This, however, will not be the general rule. To accommodate sharing of any signals of these vectors between concurrent FSMs, I recommend that a conventional switching structure, such as a cross-bar switch 38, be provided to selectively couple respective ones of the signals comprising the current input vector and the next state vector to respective ones of the inputs to the SM 16. To facilitate switching between FSMs, both by automatic action of the active FSM or by intervention by the context controller 34, I provide a context control mux 40. Thus, under control of the context controller 34, the internal switching configuration of the switch 38 can be selectively modified by either the active FSM, via the output vector, or by the context controller 34, via the programming port.

In general, it is desirable to be able to dynamically alter the mask stored in the MM 18 to account for context-dependent variations in the patterns of several bits comprising the match vector produced by the CA 10. Accordingly, I recommend providing a match control mux 42 to facilitate modification of the match mask stored in the MM 18. Thus, under control of the context controller 34, the match mask stored in the MM 18 can be selectively modified by either the active FSM, via the output vector, or by the context controller 34, via the programming port.

As will be clear to those skilled in this art, my RFSM 2 is a significant improvement over the prior art because it:
  Is fully re-programmable without hardware changes;
  Is dynamically re-programmable;
  Supports high speed operation;
  Supports very large FSMs;
  Supports multiple independent and dependent FSMs; and
  Provides fast FSM context switching.

Thus it is apparent that I have provided a more efficient apparatus and method for re-programming a FSM. Those skilled in the art will recognize that modifications and variations can be made without departing from the spirit of my invention. For example, although I have described a clock halting mechanism to protect against metastability, it would certainly be possible to use other mechanisms to disable, at least for the duration of the critical portions of the programming operation, those portions of the RFSM 2 that might otherwise enter an undesirable metastable state. Therefore, I intend that my invention encompass all such variations and modifications as fall within the scope of the appended claims.

What I claim is:

1. A re-programmable finite state machine ("RFSM") comprising:
  a content addressable memory ("CAM") comprising
    a compare register adapted to store a status vector to be matched, the compare register coupled for receiving a current state vector and an input vector which together comprise the status vector,
    a status mask register adapted to store a status mask, and to generate a masked status vector as a function of the status vector and the status mask,
    a compare array adapted to store a re-programmable plurality of compare vectors for a plurality of finite state machines, and to generate as an output a match vector as a function of respective bits of said masked status vector and said compare vectors, and
    a match mask register adapted to store a match mask, and to generate a masked match vector as a function of the match vector and the match mask, the masked match vector containing the compare vectors for a particular one of the plurality of finite state machines;
  an output array adapted to store a re-programmable plurality of control vectors, and to select for output one of said control vectors as a function of said masked match vector, a first portion of said selected control vector comprising the next state vector of said status vector and a second portion of said selected control vector comprising an output vector, the next state vector of the control vector coupled to the CAM for generating a next status vector for the CAM;
  a programming port coupled to the status mask register and the match mask register for selectively loading the status mask into the status mask register and loading the match mask into the match mask register;
  a context controller coupled to the RFSM through the programming port; and
  a context memory coupled to the RFSM through the context controller, the context memory storing the status mask and match mask for a plurality of Finite State Machines (FSMs);
  wherein the context controller downloads the status mask and match mask for a particular FSM in response to a context switch request signal; and
  wherein the particular one of the plurality of finite state machines is determined based on a selection of the status mask and the match mask.

2. The RFSM of claim 1 wherein the compare register is comprised of a plurality of edge-triggered flip-flops, each adapted to store, in synchronization with a clock signal, respective bits of said status vector.

3. The RFSM of claim 1 wherein the compare array is comprised of a plurality of match elements, each comprising:
  a compare latch, comprised of a plurality of RWM cells, adapted to store a selected one of said compare vectors, and
  compare logic which generates as an output a respective bit of said match vector as a function of respective bits of the masked status vector and the stored compare vector.

4. The RFSM of claim 3 wherein each of said compare vectors is comprised of a state compare portion and an input compare portion.

5. The RFSM of claim 1 wherein the CAM is further characterized as a ternary CAM.

6. A re-programmable finite state machine ("RFSM") comprising:
  a content addressable memory ("CAM") comprising
    a compare register adapted to store a status vector to be matched, the compare register coupled for receiving a current state vector and an input vector which together comprise the status vector, and
    a compare array coupled to the compare register, the compare array adapted to store a re-programmable plurality of compare vectors and generate as an output a match vector as a function of respective bits of said status vector and said compare vectors;
  an output array coupled to the CAM and adapted to store a re-programmable plurality of control vectors, and to select for output one of said control vectors as a function of said match vector, a first portion of said selected control vector comprising the current state vector of said status vector and a second portion of said selected control vector comprising an output vector, the current state vector of the control vector coupled to the CAM for generating a next status vector for the CAM;
  a programming port coupled to the CAM for selectively providing a status mask for masking the status vector applied to the compare array and for selectively providing a match mask for masking the match vector;

a context controller coupled to the RFSM through the programming port; and a context memory coupled to the RFSM through the context controller, the context memory storing the status mask and match mask for a plurality of Finite State Machines (FSMs);

wherein the context controller downloads the status mask and match mask for a particular FSM in response to a context switch request signal.

7. The RFSM of claim 6 wherein the compare array is comprised of a plurality of match elements, each comprising:

a compare latch, comprised of a plurality of RWM cells, adapted to store a selected one of said compare vectors, and logic which generates as an output a respective bit of said match vector as a function of respective bits of the status vector and the stored compare vector.

8. The RFSM of claim 6 wherein each of said compare vectors is comprised of a state compare portion and an input compare portion.

9. The RFSM of claim 6 wherein the CAM is further characterized as a ternary CAM.

\* \* \* \* \*